United States Patent
Lawall et al.

(10) Patent No.: US 7,931,337 B2
(45) Date of Patent: Apr. 26, 2011

(54) RECLINER RELEASE ACTUATION THROUGH ACTIVE MATERIALS

(75) Inventors: Jennifer P. Lawall, Waterford, MI (US);
Diane K. McQueen, Leonard, MI (US);
Nancy L. Johnson, Nothville, MI (US);
Alan L. Browne, Grosse Pointe, MI (US); Paul W. Alexander, Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 276 days.

(21) Appl. No.: 12/051,845

(22) Filed: Mar. 20, 2008

(65) Prior Publication Data
US 2009/0236884 A1 Sep. 24, 2009

(51) Int. Cl.
*B60N 2/00* (2006.01)
(52) U.S. Cl. .................. 297/354.12; 297/367; 297/368; 297/369; 297/378.1
(58) Field of Classification Search ............. 297/378.12, 297/378.1, 378.14, 367–369, 373, 354.12
See application file for complete search history.

(56) References Cited

U.S. PATENT DOCUMENTS

| 5,192,147 | A | * | 3/1993 | McCloskey | 403/322.3 |
| 5,771,742 | A | * | 6/1998 | Bokaie et al. | 74/2 |
| 6,086,097 | A | * | 7/2000 | Van Wynsberghe | 280/748 |
| 6,910,714 | B2 | * | 6/2005 | Browne et al. | 280/753 |
| 7,547,070 | B2 | * | 6/2009 | Nathan et al. | 297/378.12 |
| 7,556,315 | B2 | * | 7/2009 | Nathan et al. | 297/378.12 |
| 2001/0001220 | A1 | | 5/2001 | Rohee et al. | |
| 2002/0135196 | A1 | * | 9/2002 | Bingle et al. | 296/76 |
| 2002/0145315 | A1 | * | 10/2002 | Fraley et al. | 297/216.13 |
| 2003/0080601 | A1 | * | 5/2003 | Charras et al. | 297/378.12 |
| 2005/0023086 | A1 | * | 2/2005 | Szilagyi | 188/67 |
| 2005/0218710 | A1 | * | 10/2005 | Browne et al. | 297/452.64 |

FOREIGN PATENT DOCUMENTS

| JP | 3415209 B2 | 4/2003 |
| KR | 10-2001-0085092 A | 9/2001 |
| WO | 2007/000041 A2 | 1/2007 |

* cited by examiner

*Primary Examiner* — Laurie K Cranmer

(57) ABSTRACT

A recliner adjustment system and method utilizing active material based actuation is adapted for use with a recliner defining an engaging surface and operable to adjust the angle of inclination of the surface, and includes a locking mechanism configured to selectively prevent the surface from pivoting, an unlocking actuator including at least one active material element configured to release the mechanism when activated or deactivated, a signal source operable to generate and deliver to the element an activation signal, and more preferably, a second adjusting actuator including a second active material element configured to rotationally displace the surface, so as to adjust the angle, when activated or deactivated and the mechanism has been released.

6 Claims, 5 Drawing Sheets

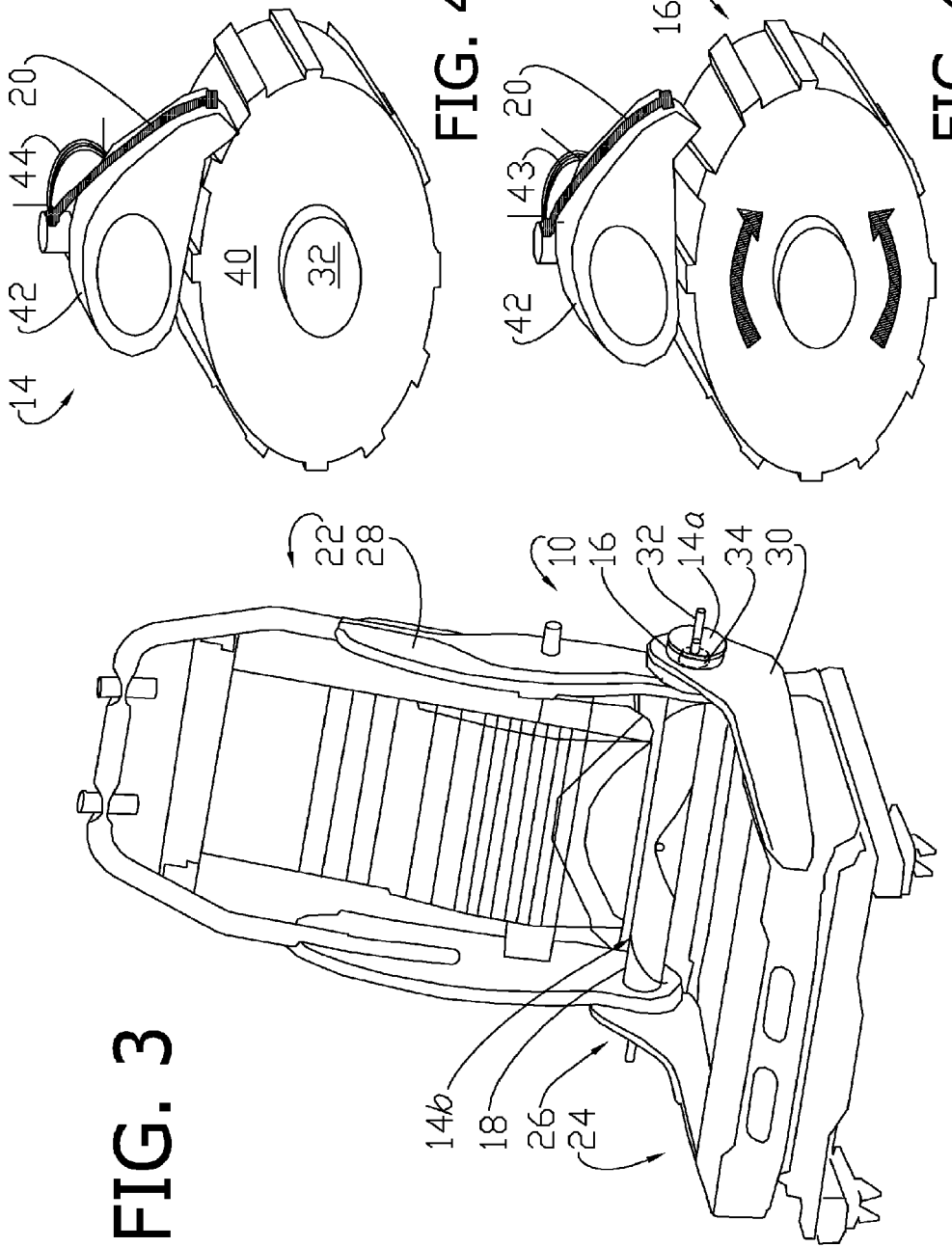

RECLINER RELEASE ACTUATION THROUGH ACTIVE MATERIALS

BACKGROUND

1. Field of the Invention

The present disclosure relates to methods of reclining a support surface, and recliner adjustment systems. More particularly, the invention concerns a recliner having an active-material based adjustment system and methods of adjusting the angle of inclination of a support surface utilizing active materials.

2. Discussion of Prior Art

Conventional recliners have long employed various manual, and power (e.g., electromechanical, electro-pneumatic, etc.) systems to adjust the angle of inclination defined by their engaging surfaces. In the automotive setting, for example, it is widely appreciated that the front driver and passenger seats are reclinable by initially releasing a locking mechanism. Traditionally, this mechanism has been manually released and located near the lower left corner of the back support of the driver and lower right corner of the front passenger support. Once released, the occupant in some cases must produce the force necessary to manipulate the back support. Concernedly, however, the input device, such as a lever arm 1 (FIG. 1), provided to facilitate the application of force required for deployment, often protrudes from the back support and into the passenger cabin, hindering the operation of vehicular systems, such as the side air bags, as well as passenger comfort. Moreover, reaching the lever arm when seated can often be a difficult task for the occupant.

Power systems typically employ complex structures, many interconnected and moving parts, at least one motor, and a power source (e.g., the charging system of the vehicle) drivenly coupled to the motor. More particularly, when an actuator (e.g., a power seat switch) is turned on by the operator, a battery voltage supply circuit is closed, so as to feed at least one motor control circuit that activates the motor. In some cases, the motor is bi-directional, and at least two control circuits configured to oppositely drive the motor are coupled thereto. When one control circuit is actuated, the other remains grounded.

Power systems, however, also present concerns. For example, the many moving parts of the locking mechanism and actuator must be charged at all times, thereby placing a substantial load upon the battery. The volume of parts present more opportunity for dysfunction and failure, which thereby increases repair and replacement costs; and finally, it is appreciated that electromechanical actuation of the locking mechanism and actuator often produces an audible nuisance.

Thus, for these reasons and more, there is a need in the art for an improved system for and method of adjusting a reclining angle.

BRIEF SUMMARY

Responsive to this need, preferred embodiments of an improved system and method of releasing a recliner adjustment locking mechanism and adjusting a recliner surface utilizing active materials are provided by the present invention. Among other things, the invention is useful for providing means for locking, releasing the lock, and effecting a change in the angle of inclination of the support surface. The system relies upon the natural response of active materials when exposed to a respective activation signalization to provide reliable, efficient, and quiet means of actuation.

In a first aspect of the invention, a recliner adjustment system utilizing active material based actuation is presented, and adapted for use with a structural support. The support is pivotably connected to a base and defines an engaging surface. The system includes a mechanical joint intermediate the support and base, a locking mechanism, an active material element, and a signal source. The locking mechanism is coupled to and configured to selectively engage the joint so as to prevent the support from pivoting relative to the base and retain the support in a fixed position wherein a first reclining angle between the surface and horizontal is defined. The active material element is connected to the mechanism and configured to cause the mechanism to disengage the joint, when activated or de-activated. The signal source is drivenly coupled to the element and configured to generate an activation signal operable to activate the element.

A second aspect concerns a method of releasing, reclining and fixing a support surface utilizing an active material element. The method includes the steps of securing the surface relative to horizontal so as to define a first reclining angle therewith. The element is secured relative to the surface such that a fundamental property of the element causes the surface to be fixedly secured. Next, the element is activated so as to change the property to an activated condition, wherein the surface is released and the angle is able to be modified. The surface is then manipulated when the element is in the activated condition so as to define a second reclining angle with horizontal. Lastly, the element is de-activated so as to fixedly secure the surface when the second angle is defined.

It is appreciated that the system presents various advantageous with respect to and improvements over the prior art. For example, active material actuation allows for push button recliner release with minimal added cost, weight, package space and complexity. With respect to automotive settings, this provides a replacement for manual recliner handles that may interfere with side airbag deployment zones, and passenger comfort. Moreover, utilizing active-material based actuation results in fewer moving parts than conventional mechanisms, which further results in lower repair and replacement costs. The systems provide a method of actuation that produces significantly less noise, and is more energy efficient. Finally, the invention allows for more accessible placement of seat recliner controls.

Further inventive methods of releasing, adjusting, and relocking a recliner adjustment mechanism involving releasing stored energy, and employing locking pins, a ratcheted interface, and more are presented herein, with reference to U.S. Non-Provisional application Ser. No. 11/856,744 filed on Sep. 18, 2007, entitled ACTIVE MATERIAL ACTIVATED COVER (hereinafter the 744-Application), and incorporated by reference herein. The above described and other features are exemplified by the following figures and detailed description.

BRIEF DESCRIPTION OF THE DRAWINGS

Preferred embodiments of the invention are described in detail below with reference to the attached drawing figures, wherein:

FIG. 3 is a perspective view of a seat frame, particularly illustrating the inner-workings of the pivot joint, and the recliner adjustment system, in accordance with a preferred embodiment of the invention;

FIG. 4 is a schematic perspective view of an active material based actuator suitable for use with the present invention, and particularly illustrating a pawl engaging a gear wheel, in accordance with a preferred embodiment of the invention;

FIG. 4a is a schematic perspective view of the actuator shown in FIG. 4, illustrating the gear and pawl in a disengaged condition caused by activating the active material element;

DETAILED DESCRIPTION

Referring to FIGS. 1-9, the present invention involves a system 10 for and method of adjusting a recliner 12 by changing the angle of inclination (i.e., reclining angle) of at least one engaging surface 12a defined by the recliner 12. The system 10 is described and illustrated herein with respect to the reclining function of an automotive seat, such as the driver or front passenger seat shown in FIG. 1; however, it is certainly appreciated that the invention may be used with other recliners 12, such as certain models of hospital beds, residential furniture, etc. As such, the following description of preferred systems and methods of employing these actuators with respect to a recliner is merely exemplary in nature and is in no way intended to limit the disclosure. It is appreciated that other actuator configurations consistent with the teachings of the present invention could be determined and utilized by those of ordinary skill in the art.

Figure 2:
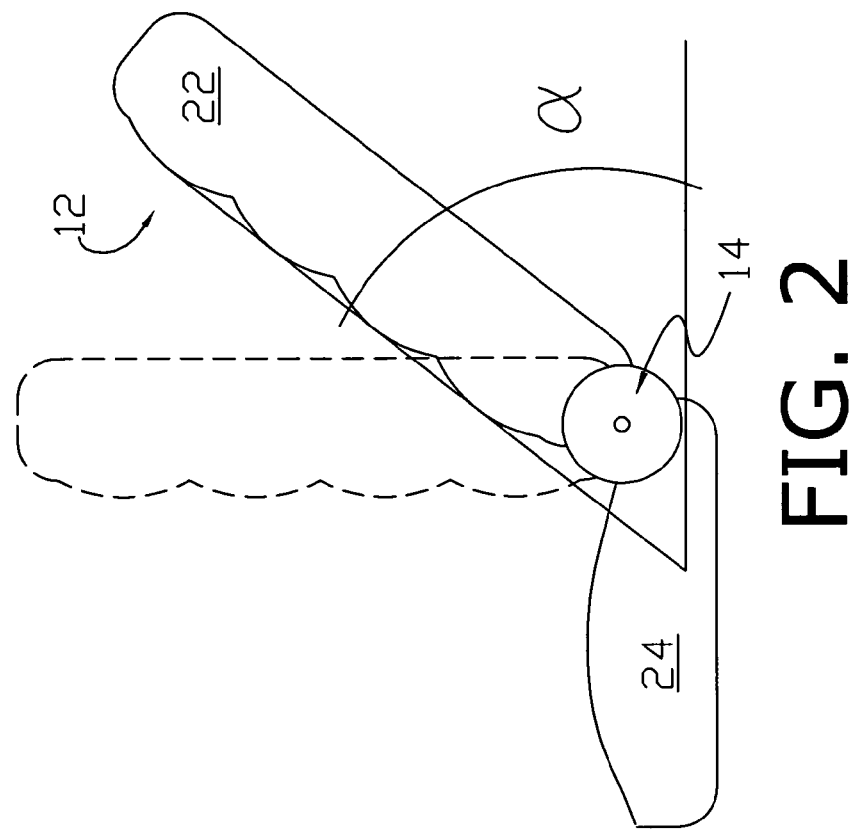
FIG. 2 is a side elevation of a recliner, particularly defining first and second (in hidden-line type) angles of inclination defined by the engaging surface and horizontal, in accordance with a preferred embodiment of the invention.
Figure 1:
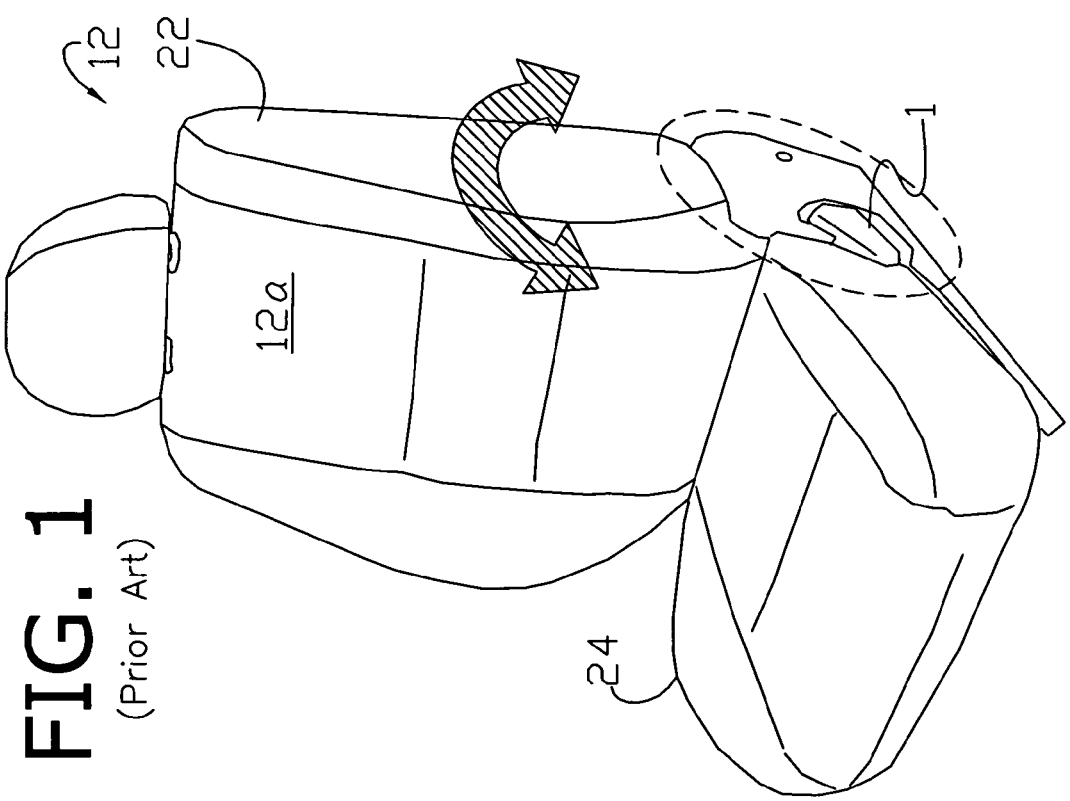
FIG. 1 is a perspective view of a prior art automotive seat generally illustrating a back support, base, and the recliner adjustment system.

The inventive system 10 utilizes active-material based actuation (i.e., actuation that utilizes the responsive action of an active material to perform its primary function) to enable/disable the adjustability of the recliner 12 and/or effect the adjustment itself. That is to say, the system 10 includes at least one active material actuator 14 for selectively engaging and holding a locking mechanism 16 and/or engaging a rotational device 18 that causes the adjustment of the angle of inclination, α, defined by the surface 12a (FIG. 2). More preferably, the system 10 utilizes a first active material actuator 14a to unlock the recliner 12 and a second active material actuator 14b to effect the adjustment (FIG. 3). Except where otherwise stated, however, it is understood and appreciated that references to an "actuator 14" shall be deemed to refer to both the unlocking and adjusting actuators 14a,b. Moreover, it is also within the ambit of the invention to combine the unlocking and adjusting actuators into a single integral actuator.

As used herein, the term "active material" (AM) shall mean any material or composite that undergoes a reversible fundamental (e.g., intensive physical, chemical, etc.) property change when activated by an external stimulus or signal, as this term is understood and defined by those of ordinary skill in the art. The inventive methods employ the reversible shape, stiffness, and/or shear strength change capabilities of different classes of "active materials" to unlock to enable, perform an adjusting action, and relock to secure the recliner 12. In the illustrated embodiment, the actuator 14 includes a heat responsive active material element 20, such as a shape memory alloy (SMA), shape memory ceramic (SMC), or thermoresponsive shape memory polymer (SMP). A detailed explanation of these and other suitable active materials can be found in the 744-Application, and as such will not be repetitively provided herein.

However, it is appreciated by those of ordinary skill in the art that SMA exhibits a modulus increase of 250% and a dimensional change of up to 8% (depending on the amount of pre-strain) when heated above its Martensite to Austenite phase transition temperature. Moreover, stress induced phase changes in SMA are two-way by nature. That is to say, the application of sufficient stress when an SMA element is in its Austenitic phase causes it to change to its lower modulus Martensitic phase. Afterward, removal of the applied stress will cause the element to switch back to its Austenitic phase, in so doing recovering its starting shape and higher modulus. Therefore, an SMA based actuator 14, in the present invention, may require a return feature to relock the mechanism 16, while stress-applied designs may only require the removal of the applied stress (such as electrical load) to cause the mechanism 16 to relock after adjusting the recliner 12.

Returning to FIGS. 1-3, the illustrated recliner 12, more particularly, presents a back support 22 that is pivotably connected to a base 24, as known in the art. The support 22 defines the engaging surface 12a, whereupon the occupant (not shown) typically rests his or her back. A central pivot joint 26 is defined by the inner-structure of the support 22 and base 24, as shown in FIG. 3. For example, structure within the exterior cushion cover and pads of the support 22 and base 24, and more particularly, vertical side rails 28 of the back support 22 and horizontal rails 30 of the base 24 may cooperatively define alignable holes through which a recliner rod 32 extends. Two jam nuts 34 securely receive the extended portion of the rod 32. Thus, in the illustrated embodiment, in order for the back support 22 to adjust, it must pivot or rotate relative to and about the central axis defined by the rod 32.

The locking mechanism 16 is configured to selectively engage the joint 26 with a stationary member of the recliner 12, so as to prevent the back support 22 from pivoting relative to the base 24. When engaged, the locking mechanism 16, therefore, secures the recliner 12 in a fixed condition, where the first reclining angle, α, is defined between the surface 12a and horizontal (FIG. 2). The first actuator 14a is drivenly coupled to the locking mechanism 16 and configured to selectively cause it to engage the joint 26. With respect to the unlocking actuator 14a, the active material element 20 may be connected to the mechanism 16 directly and configured to cause the mechanism 16 to disengage the joint 26, when activated. Where the element 20 presents an SMA wire and is activated so as to shrink the wire 20, the force generated by shrinking causes an action in the mechanism 16 that disengages the joint 26. The actuator 14 may be configured such that the SMA wire 20 pulls on a bracket, which in turn releases the joint 26, and more preferably provides mechanical advantage through leveraging.

An activation signal source 36 is coupled to and operable to generate an activation signal that activates the element 20

Figure 5:
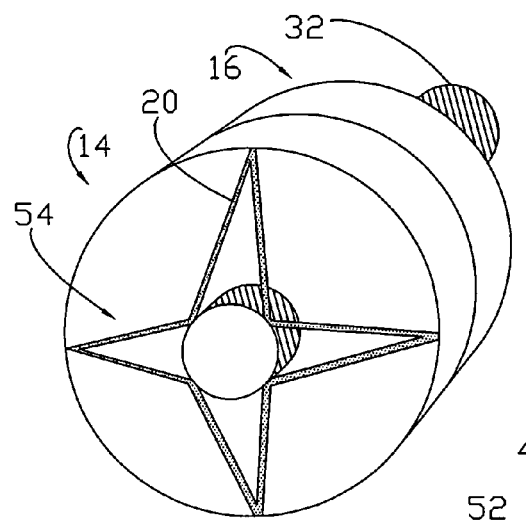
FIG. 5 is a schematic perspective view of an active material based actuator suitable for use with the present invention, and particularly illustrating a locking disk engaging a driven wheel so as to form a ratcheted interface, in accordance with a preferred embodiment of the invention.
Figure 5A:
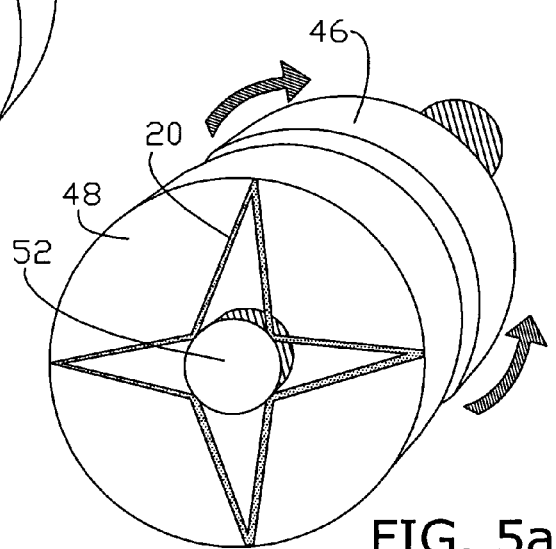
FIG. 5a is a schematic perspective view of the actuator shown in FIG. 5, particularly illustrating the wheel and disk in a disengaged condition caused by activating the active material element.
Figure 5B:
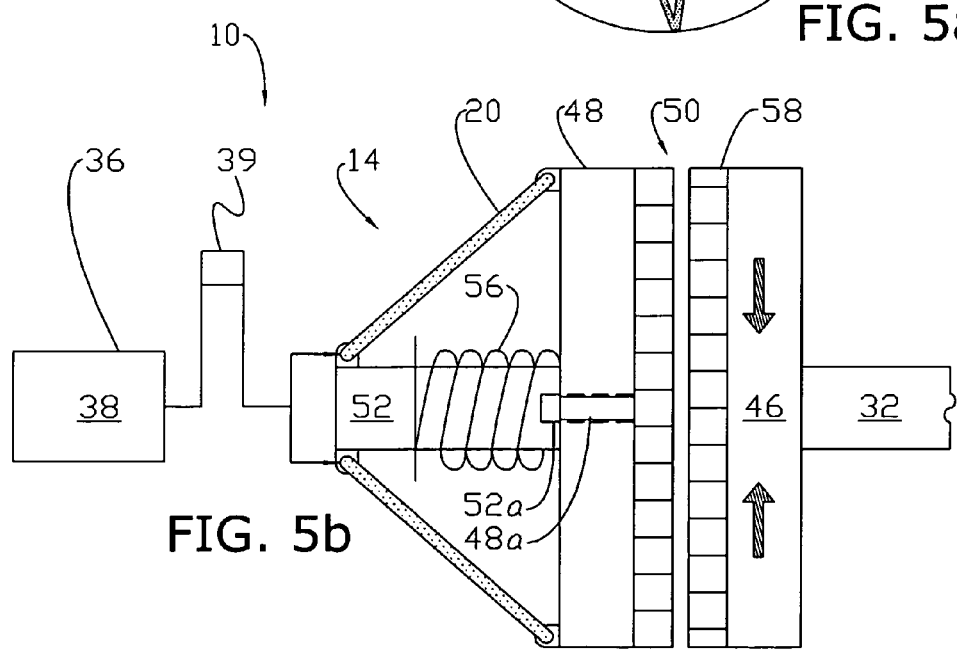
FIG. 5b is a schematic elevation view of the actuator shown in FIG. 5 particularly showing the ratcheted interface, a biasing spring, input device and signal source.

(FIG. 5b). In an automotive setting, the signal source 36 is preferably presented by the charging system, including the battery 38, of the vehicle via a series of electrical leads, fuses and/or connectors (not shown). The source 36 is operable to pass an electric current through the wire 20. Passage of the electric current through the resistance of the wire 20 produces the heat energy that causes the wire 20 to shrink. An input device 39 intermediately coupled to the source 38 and actuator 14 may be configured to allow an operator to control the generation and delivery of the activation signal to the actuator 14. For example, a device 39 may present a push button conveniently located for easy access by the driver or front passenger. Once activated, the device 39 is preferably configured to further de-activate the element 20 by de-actuating the device.

Alternatively, the actuator 14a may be conversely configured such that de-activating the element 20 causes the mechanism 16 to disengage the joint 26. In another alternative, the actuator 14a may be indirectly coupled to the mechanism 16 by an energy-releasing element (not shown). Upon actuation of the element 20, the releasing element is configured to release stored energy that directly causes the mechanism 16 to disengage. For example, the releasing element may include a biased spring that is freed or a weight allowed to drop.

As shown in FIGS. 4 and 4a, the joint 26 may include a sprocket gear 40 attached to the extended portion of the rod 32, and the locking mechanism 16 may include at least one pawl 42 configured to selectively engage the peripheral teeth of the gear 40, so as to prevent the gear 40 from rotating in at least one direction. More preferably, the pawl 42 and gear 40 are cooperatively configured to prohibit rotation in a predetermined one of clockwise and counter-clockwise directions, so that the back support 22 is not allowed to rotate rearward. It is appreciated that the presence of the occupant will prevent the back support 22 from rotating forward. A torsion spring 43 is preferably provided to bias the pawl 42 towards the gear 40.

In this configuration, the element 20 presents an SMA wire connected to the distal end of the pawl 42 (FIG. 4). The other end of the wire 20 is connected to a fixed prong 44 attached, for example, to either the vertical or horizontal side rails 28,30, and about which the pawl 42 pivots. It is appreciated that when attached to the vertical side rails 28, such that the disengaged pawl 42, element 20, and prong 44 rotate along with the back support 22 (FIGS. 4 and 4a), the gear 40 is fixed; and where the pawl 42 is attached to the horizontal side rails 30 of the base 24, the pawl 42, prong 44 and element 20 are stationary while the gear 40 rotates with the back support 22. Once the surface 12a has been manipulated, the activation signal is terminated, so as to allow the element 20 to cool. Once the element 20 has been cooled past a predetermined temperature (e.g., the Martensite start temperature for an SMA wire), the change in the fundamental wire property will be reversed, allowing the pawl 42 to be returned to a locking position by the spring. Alternatively, a secondary SMA element or electrical connection (also not shown) may be provided to promote the return of the mechanism 16 to the locked position.

In another preferred embodiment, the joint 26 may include a driven wheel 46 fixedly connected to the back support 22 (FIGS. 5-5b). The locking mechanism 16 includes a disk 48 concentrically aligned with the rod 32 and wheel 48. The disk 48 and wheel 46 cooperatively present a ratcheted interface 50, when engaged, such that relative rotation is prevented in at least one direction. The element 20 is operable to cause the disk 48 to selectively engage the wheel 46. For example, an SMA wire 20 may be coupled to the disk 48 and a stationary structure 52, such as a stationary prong coaxially aligned with the rod 32, as shown in FIGS. 5-5b. The disk 48 and prong 52 are cooperatively configured such that the disk 48 is able to translate but not rotate relative to the prong 52, and as such may define a groove 52a and projectile 48a that runs within the groove 52a. The wire 20 preferably presents a star configuration having a plurality of legs 54, wherein each leg 54 pulls the disk 48 an equal distance outward and away from the wheel 46, as the wire 20 shrinks. It is appreciated that the number of legs 54 is proportional to the magnitude of the pull force vector generated by the wire 20. More preferably, to add further engaging (or holding) force, the disk 48 may be biased towards the wheel 46, such as for example, by a spring 56 (FIG. 5b). The interface 50 may include a plurality of sloped teeth 58 configured to prohibit the rotation of the disk 48 in one direction. Alternatively, and as shown in FIG. 5b, the teeth 58 may present orthogonal faces so as to bi-directionally prevent rotation.

Figure 6:
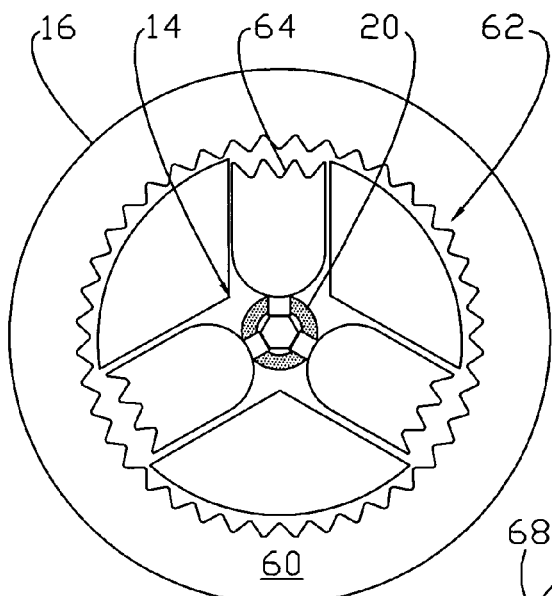
FIG. 6 is a schematic elevation view of an active material based actuator suitable for use with the present invention, and particularly illustrating a sun gear presenting radially interior teeth, a series of pawls translatable within a race, and a circular active material element connected to and configured to drive the pawls, so as to selectively engage the teeth.
Figure 6A:
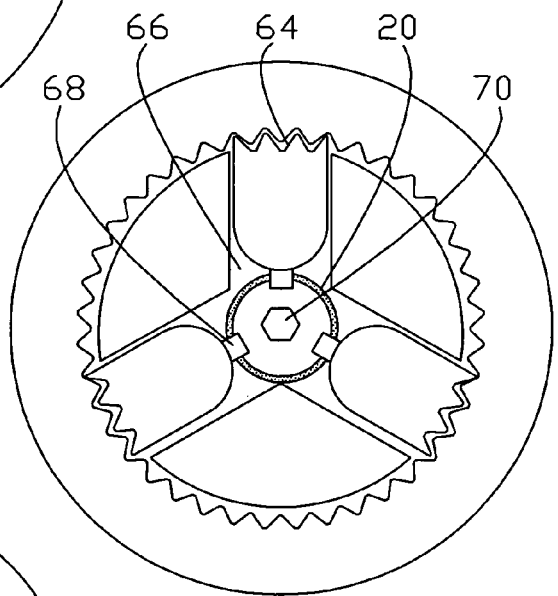
FIG. 6a is a schematic partial elevation view of the actuator shown in FIG. 6, particularly illustrating the gear and pawls in an engaged condition.

In another preferred embodiment, the joint 26 may include a ring gear 60 presenting a row of radially interior teeth 62 (FIGS. 6-7) and fixedly attached to the back support 22. As shown in FIG. 6, the actuator 14a may include at least one and more preferably a plurality of pawls 64 configured to selectively engage the teeth 62. The pawls 64, being non-rotatable relative thereto, cause the gear 60 to lock when engaged therewith. In this configuration, the element 20 preferably presents a circular configuration, is concentrically aligned with the gear 60, and presents deactivated and activated circumferences. The pawls 64 are drivenly connected to the element 20 and oriented, so as to be caused to engage the teeth 62 when the element 20 presents the deactivated circumference. When the activation signal is delivered to the element 20, so as to cause it to shrink, the pawls 64 disengage the gear teeth 62, as shown in FIG. 6. To facilitate this action being radially symmetric with respect to the central axis of rotation so that the pawls 64 equally engage the teeth 62, a recessed race 66 is preferably defined by the actuator 14 and configured to retain and guide the element 20 and pawls 64. The race 66 defined by an interior radius slightly less than (e.g., 98% of) that defining the activated circumference, so that the element 20 does not sag to cause the lowermost pawl 64 to engage the teeth 62. Where the pawls are coupled to the element by a rectangular stirrup 68 (FIGS. 6 and 6a), the race 66 is partially defined by a central polygonal hub 70, for added stability during engagement with an activated element 20.

Figure 7:
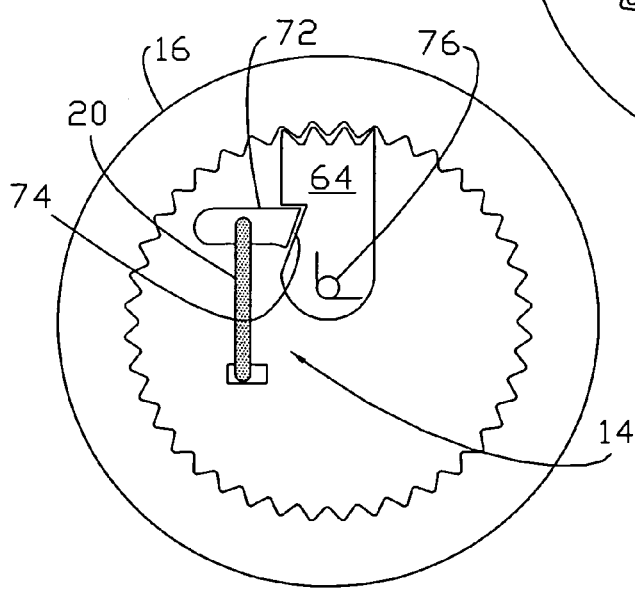
FIG. 7 is a schematic elevation view of an actuator having an active material driven cam, in accordance with a preferred embodiment of the invention.

In another preferred embodiment, the actuator 14a may further include a cam 72 configured, for example, to cause the disengagement between a pawl 64 and gear 60. As shown in FIG. 7, the cam 72 may be connected to the SMA wire 20 and cooperatively configured with the pawl 64 so as to form an engaging slope interface 74. This configuration results in the generation of a disengagement force between the pawl 64 and gear teeth 62, when the cam 72 is caused to translate by the shrinkage of the wire 20. A torsion spring 76 may be predisposed about the pawl pivot point (FIG. 7), and configured to cause the pawl 64 to re-engage the teeth 62 when the change in the element 20 is reversed.

Figure 8:
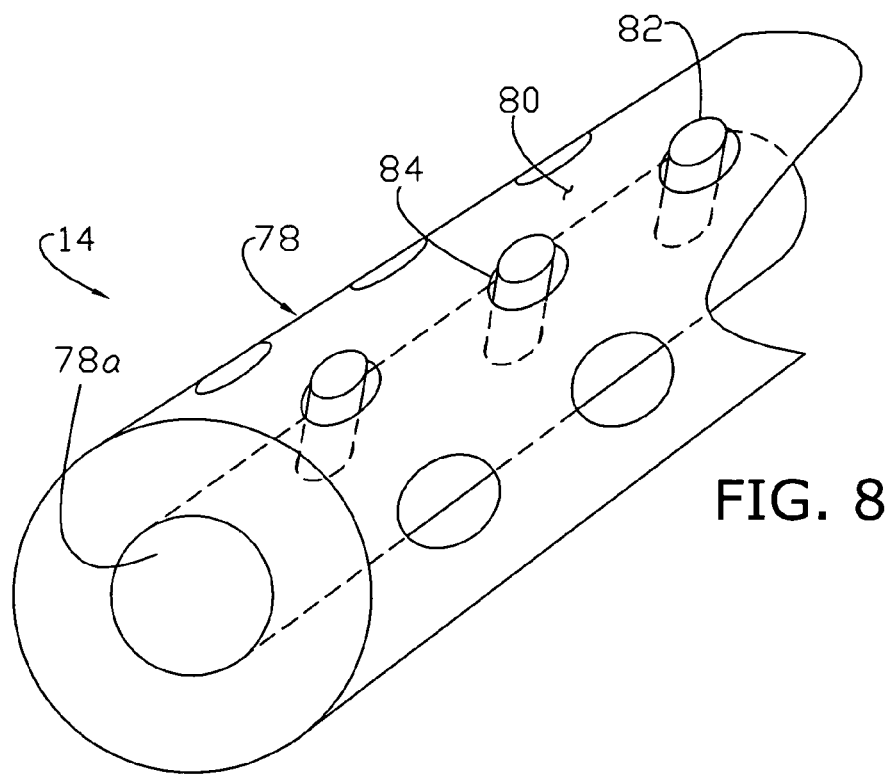
FIG. 8 is a partial perspective view of a cylindrical tube and active material pin actuator configured to selectively engage, so as to lock, the tube, in accordance with a preferred embodiment of the invention.

In yet another embodiment shown in FIG. 8, the joint 26 includes a cylindrical torque tube 78 preferably formed by a continuous wall 80. The tube 78 is fixedly attached to the back support 22, and concentrically aligned with the rod 32, so that the tube 78 rotates as the support 22 pivots. The locking mechanism 16 includes at least one and more preferably a plurality of pins 82. The wall 80 defines a matching number of holes 84, each configured to tightly (e.g., preventing lateral motion in any direction a distance greater than 5% of the pin diameter) receive a respective pin 82. More preferably, the seat back chuck (i.e., amount the seat back moves at the top of the seat when a load is applied) determines the tolerance of the pins 82; and the joint 26 is preferably designed to hold the chuck below 2 mm. The pins 82 are preferably configured such that the plurality of pins 82 is offset slightly to form a tight joint when locked. Moreover, the preferred pins 82 are slightly tapered to facilitate proper locating and form a tight connection as they engage.

The actuator 14a is drivenly coupled to each pin 82 and operable to cause each pin 82 to be inserted within and withdrawn from the respective hole 84. The pins 82 may be mounted on and pulled within an inner tube 78a (FIG. 8) when actuated, wherein the inner tube 78a connects inboard and outboard recliner mechanisms. The pins 82 and the inner tube 78a are non-rotatable relative to the main tube 78, so as to prevent it from rotating, when the pins 82 are aligned with and inserted into a respective holes 84. It is appreciated by those of ordinary skill in the art, however, that either tube, 78 or 78a, could be fixed while the other is allowed to rotate. Alternatively, the pins 82 may be biased towards extended conditions by internal springs (not shown), and caused to retract by activating the element 20; once the angle is adjusted, the element 20 is de-activated, so as to allow the pins 82 to enter into the next available hole 84.

Figure 9:
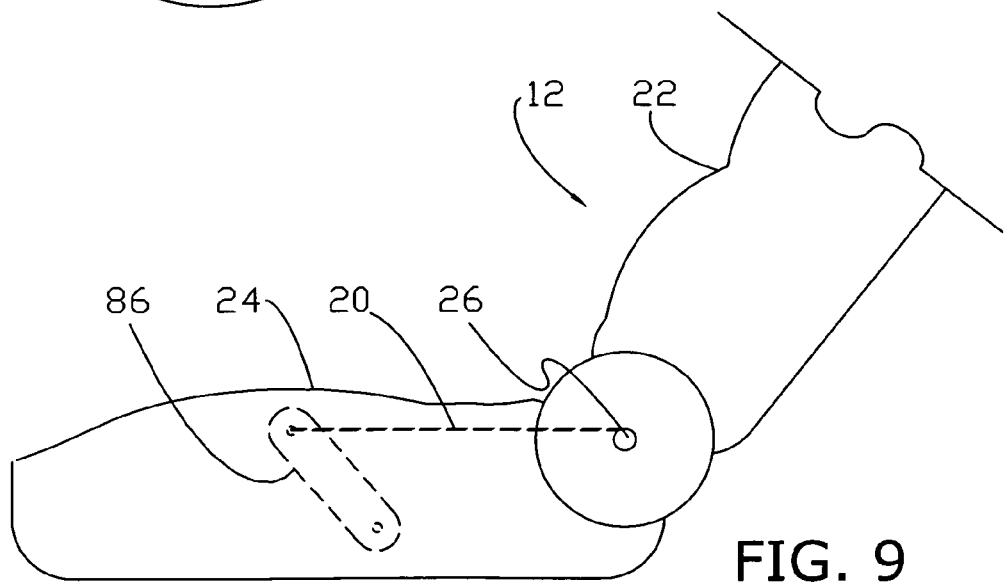
FIG. 9 is an elevation view of a recliner and an active material based actuator having an externally anchored active material element, in accordance with a preferred embodiment of the invention.

Lastly, an external embodiment of actuation may be utilized wherein the SMA wire 20 is securely connected to a fixed anchor 86 located exterior to the joint 26 (FIG. 9). For example, the anchor 86 may be presented by an anchor portion of the horizontal side rails 30 spaced from the joint 26. It is appreciated that spacing the anchor 86 enables substantially greater wire spans, greater shrinkage, and therefore, greater actuation force and distance for releasing the mechanism 16. The other end of the wire 20 connects to the mechanism 16 or joint 26 as previously described, thereby essentially supplanting a conventional recliner lever.

As previously mentioned, another aspect of the invention involves utilizing active materials to effect the adjustment of the engaging surface 12a in addition to releasing the locking mechanism 16. As previously mentioned, a second adjusting (or pivoting) actuator 14b may be drivenly coupled to the joint 26, and configured to adjust the reclining angle, when activated or deactivated. The signal source 38 is therefore further coupled and configured to deliver an activation signal to the second actuator 14b either concurrently or sequential to the unlocking actuator 14a. As such, the preferred input device 39 is also intermediately coupled to the source 38 and actuator 14b and configured to allow the operator to control the generation and delivery of the activation signal to the actuator 14b. The 744-application describes in detail various exemplary configurations of active material actuators operable to convert a change in an active material element into the rotational displacement of further structure (for example, see FIGS. 5 and 7-9 therein). Although the rotational displacement described therein is used to deploy a cover, it is well within the ambit of the present invention to utilize the rotational displacement of the applicable actuators to pivot the back support 22 by fixing the rotatable portion of the actuator 14b to the back support 22 (e.g., at the vertical side rails 28), as shown in FIG. 3. As such, a detailed description of the adjustment actuator 14b is not repetitively provided herein. To promote this function, the actuators described in the 744-application may be further modified by those of ordinary skill in the art to reduce rotational displacement in exchange for increased force.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A recliner adjustment system utilizing active material based actuation, and adapted for use with a structural support, wherein the support is pivotably connected to a base and defines a support surface, said system comprising:
    a mechanical pivot joint intermediate the support and base;
    a locking mechanism coupled to and configured to selectively engage the joint so as to prevent the support from pivoting relative to the base and define a first reclining angle between the surface and horizontal;
    an unlocking actuator including a first active material element connected to the mechanism and configured to cause the mechanism to disengage the joint, when activated or deactivated;
    an adjusting actuator including a second active material element connected to the joint and configured to manipulate the surface, so as to adjust the reclining angle, when activated or deactivated; and
    a signal source drivenly coupled to the first and second elements and configured to generate an activation signal operable to activate said elements.

2. The system as claimed in claim 1, wherein the mechanism is biased towards the engaged condition, so as to re-engage the joint upon deactivation of the first element.

3. The system as claimed in claim 1, wherein said joint and mechanism cooperatively present a rotatable gear and at least one pawl configured to selectively engage the gear, and prevent the gear from rotating in at least one direction when engaged.

4. The system as claimed in claim 1, adapted for use by an operator, and further comprising:
    an input device intermediately coupled to the source and first element and configured to receive an input from the operator and cause the source to generate and deliver the signal to the element based on the input.

5. The system as claimed in claim 1, wherein the first and/or second element consists essentially of a material selected from the group consisting of a shape memory alloy, shape memory ceramic, and shape memory polymer.

6. The system as claimed in claim 1, wherein the first element is a wire connected to the mechanism and a stationary structure.

* * * * *